(12) United States Patent
Nakayama (10) Patent No.: US 7,885,676 B2
(45) Date of Patent: Feb. 8, 2011

(54) WIRELESS COMMUNICATION DEVICE AND MARGINAL TRANSMISSION POWER DETERMINING METHOD

(75) Inventor: Shusuke Nakayama, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 657 days.

(21) Appl. No.: 11/427,276

(22) Filed: Jun. 28, 2006

(65) Prior Publication Data
US 2007/0004443 A1    Jan. 4, 2007

(30) Foreign Application Priority Data
Jun. 29, 2005   (JP) .................. P.2005-190636

(51) Int. Cl.
*H04B 7/00*   (2006.01)
(52) U.S. Cl. .................. 455/522; 455/68; 455/69; 455/115.3; 455/127.1
(58) Field of Classification Search .................. 455/522, 455/127.1, 127.5, 343.1, 67.11, 68–70, 115.3, 455/126, 127.2, 135, 226.3, 277.2, 296; 370/318
See application file for complete search history.

(56) References Cited

U.S. PATENT DOCUMENTS

| | | | | |
|---|---|---|---|---|
| 5,475,861 A | * | 12/1995 | Hall | .................. 455/453 |
| 6,756,773 B2 | * | 6/2004 | Koretsky et al. | .................. 323/234 |
| 7,254,413 B2 | * | 8/2007 | Muller et al. | .................. 455/522 |
| 2001/0046877 A1 | * | 11/2001 | Ohkubo et al. | .................. 455/522 |
| 2003/0048097 A1 | * | 3/2003 | Ishihara et al. | .................. 323/285 |
| 2004/0204091 A1 | * | 10/2004 | Liu et al. | .................. 455/558 |
| 2005/0043051 A1 | * | 2/2005 | Takano et al. | .................. 455/522 |
| 2005/0197147 A1 | * | 9/2005 | Stephens et al. | .................. 455/522 |

FOREIGN PATENT DOCUMENTS

| | | |
|---|---|---|
| JP | 01175015 U | 12/1989 |
| JP | 11-098845 | 4/1999 |
| JP | 2003347943 A | 12/2003 |
| JP | 2005130442 A | 5/2005 |

OTHER PUBLICATIONS

Japanese language office action dated Apr. 13, 2010 and its English language translation for corresponding Japanese application 2005190636 lists the references above.

* cited by examiner

*Primary Examiner*—Dominic E Rego
(74) *Attorney, Agent, or Firm*—DLA Piper LLP (US)

(57) ABSTRACT

A PC card terminal device operates while supplied with power from a computer in which the PC card terminal device is mounted. A transmission power controller determines a first marginal transmission power, and increases the transmission power of the PC card terminal device up to the first marginal transmission power, and further increases the transmission power increased to the first marginal transmission power at an increasing rate smaller than the increasing rate of the above-mentioned increase.

8 Claims, 11 Drawing Sheets

| PRESENT TRANSMISSION POWER(dBm) | FIRST MARGINAL POWER(dBm) |
|---|---|
| 0~5 | 19 |
| 5~10 | 19.5 |
| 10~15 | 20 |
| 15~17 | 21.5 |
| 17~18 | 21.5 |
| 18~19 | 22 |
| 19~20 | 22.5 |
| 20~21 | 23 |
| 21~22 | 23.5 |
| 22~23 | 24 |
| 23~24 | 24 |

WIRELESS COMMUNICATION DEVICE AND MARGINAL TRANSMISSION POWER DETERMINING METHOD

BACKGROUND OF THE INVENTION

The present invention relates to a wireless communication device and a marginal transmission power determining method.

A card type wireless communication device has recently become known. Such a card type wireless communication device is mounted in host equipment such as a note-book size personal computer or the like, and used for wireless communication of the host equipment.

The card type wireless communication device as described above has no power source and operates by using power supplied from the host computer. The host equipment supplies power with a standardized voltage value (for example, 3.3V±0.3V in PC Card Standard). Current input from the host equipment to the wireless communication device (consumption current of the wireless communication device) becomes larger as the power (output) of the wireless communication device becomes larger. However, there are some host equipment that cannot keep the standardized voltage when the current input to the wireless communication device increases to a predetermined current value or more, which means that the voltage value of power to be supplied to the wireless communication device is reduced.

JP-A-11-98845 describes a technique of moderately increasing the output voltage of a sine-wave converter up to a final target value to thereby prevent inrush current from flowing into the sine-wave converter. The inrush current is defined as a large amount of input current that temporarily flows when the consumption current of a device rapidly increases. The inrush current is temporary, and thus the input current is stabilized after a while from the time when the consumption current increases rapidly. The stabilized input current is called stationary current.

However, the recent wireless communication devices have a tendency to have advanced multiplexing of communications and thus the reception power required to carry out demodulation and decoding is increased, which increases the transmission power. When the transmission power increases, the consumption current is increased as described above, and the inrush current when the transmission power is rapidly increased up to the upper limit thereof may exceed the predetermined current value. At this time, the voltage value of power supplied to the wireless communication device is lowered as described above, so that the operation of the wireless communication device is unstable or reset occurs due to voltage drop. Accordingly, it is impossible to continue the communications.

In view of the foregoing problem, it may be considered to moderately increase the transmission power of the wireless communication device up to the final target value, to thereby prevent inrush current from flowing in the wireless communication device, as in the case of the technique disclosed in JP-A-11-98845.

However, if the transmission power is increased at such a speed that no inrush current flows as described above, it would take a long time until the transmission power increasing processing for greatly increasing the transmission power of the wireless communication device is completed.

SUMMARY OF THE INVENTION

The present invention has been implemented to solve the foregoing problem, and has an object to provide a wireless communication device and a marginal transmission determining method that can increase transmission power (transmission output) rapidly while suppressing the consumption current of the wireless communication device to a predetermined range corresponding to a prescribed current value.

In order to attain the above object, a wireless communication device that operates while supplied with power from host equipment in which the wireless communication device is mounted, comprises a first marginal transmission power determining unit for determining first marginal transmission power, a first transmission power increasing unit for increasing the transmission power of the wireless communication device up to the first marginal transmission power, and a second transmission power increasing unit for further increasing the transmission power increased till the first marginal transmission power at an increasing rate (degree) smaller than the increasing rate (degree) based on the first transmission power increasing unit. In the above-described wireless communication device, the first marginal transmission power determining unit may contain a transmission power controller for controlling the transmission power so that inrush current falls into a predetermined range when the transmission power of the wireless communication device is increased, and the first marginal transmission power determining unit may determine the transmission power after the increase of the transmission power as first marginal transmission power.

According to the present invention, the transmission power can be increased up to the first marginal transmission power under the condition that the inrush current is within the predetermined range, and then the transmission power can be increased at a small rate (degree). Therefore, the transmission power can be rapidly increased while suppressing the consumption current of the wireless communication device within a predetermined range corresponding to a predetermined current value.

Furthermore, the wireless communication power device may further contain a second marginal transmission power determining unit for determining second marginal transmission power larger than the first marginal transmission power, and the second transmission power increasing unit may further increase the transmission power increased to the first marginal transmission power up to the second marginal transmission power. Furthermore, in the wireless communication device, the second marginal transmission power determining unit may contain a transmission power control unit for controlling the transmission power so that stationary current falls into a predetermined range after the transmission power of the wireless communication device is increased, and the second marginal transmission power determining unit may determine the transmission power after the increase of the transmission power as second marginal transmission power.

Furthermore, in the wireless communication device, the first marginal transmission power determining unit may determine the first marginal transmission power for every transmission power before the increase, the wireless communication device may further contain a transmission power achieving unit for achieving the transmission power when the wireless communication device transmits a wireless signal, and the first transmission power increasing unit may increase the transmission power of the wireless communication device up to first marginal transmission power determined by the first marginal transmission power determining unit based on the transmission power achieved by the transmission power achieving unit. Still furthermore, in the wireless communication device, the first marginal transmission power determining unit may contain a transmission power control unit for controlling the transmission power for every transmission power before the increase so that inrush current falls into a predetermined range when the transmission power of the wireless communication device is increased, and the first marginal transmission power determining unit may determine the transmission power after the increase as first marginal transmission power for the transmission power before the increase (hereinafter referred to as before-increase transmission power).

According to the present invention, the first marginal transmission power is determined for every transmission power before the increase, and thus even when the transmission power before the increase is equal to any value, the transmission power can be rapidly increased while the consumption current of the wireless communication device can be suppressed within the predetermined range corresponding to a predetermined current value.

Furthermore, a marginal transmission power determining method according to the present invention comprises an after-increase transmission power achieving step for achieving, for consumption current of a circuit, an after-increase transmission power with which inrush current falls into a predetermined range when the output of the circuit is increased, and a first marginal transmission power determining step for determining the after-increase transmission power thus achieved as a first marginal transmission power.

DETAILED DESCRIPTION OF THE PREFERRED EMBODIMENTS

Embodiment 1

A first embodiment according to the present invention will be described with reference to the accompanying drawings.

Figure 1:
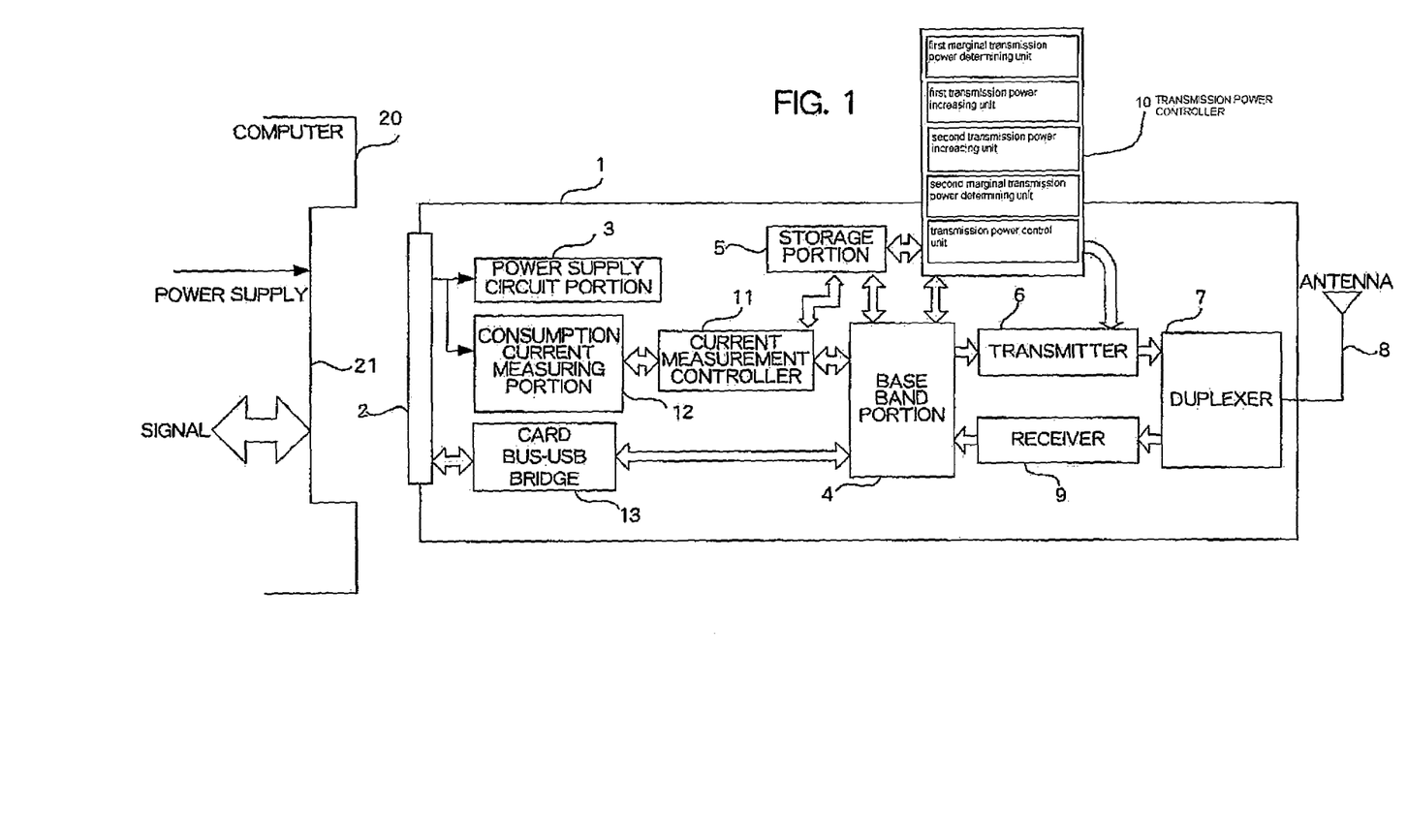
FIG. 1 is a diagram showing a system construction of a PC card terminal device according to an embodiment of the present invention.

FIG. 1 is a diagram showing the system construction of a PC card terminal device according to an embodiment of the present invention. As shown in FIG. 1, the PC card terminal device 1 is a wireless communication device functionally including a card bus connector 2, a power supply circuit portion 3, a base band portion 4, a storage portion 5, a transmitter 6, a duplexer 7, antenna 8, a receiver 9, a transmission power controller 10, a current measurement controller 11, and a consumption current measuring portion 12.

The PC card terminal device 1 is mounted in a card slot 21 of a computer 20 serving as host equipment through the card bus connector 2, and it is supplied with power from the computer 20 as described later and also carries out reception/transmission of signals. The PC card terminal device 1 relays reception/transmission of signals between the computer 20 and a base station device (not shown).

The power supply circuit portion 3 is supplied with power from the computer 20 through the card bus connector 2, and supplies power to respective parts of the PC card terminal device 1.

The base band portion 4 carries out the processing associated with communications such as modulation/demodulation of communication signals, etc. Furthermore, the base band portion 4 carries out the processing of controlling the respective parts of the PC card terminal device 1.

The storage portion 5 operates as a work memory for the base band portion 4, the transmission power controller 10 and the current measurement controller 11. Furthermore, the storage portion 5 holds programs and parameters associated with various processing executed by the base band portion 4, the transmission power controller 10 and the current measurement controller 11. Particularly, the storage portion 5 stores first marginal power, second marginal power, spec current and maximum power. The first marginal power, the second marginal power and the maximum power are stored in association with identification information for identifying the computer 20.

According to an instruction of the base band portion 4, the transmitter 6 converts the frequency of a signal output from the base band portion 4 and outputs the frequency-converted signal to the duplexer 7.

The PC card terminal device 1 carries out communications based on a time-division duplex system. Therefore, according to an instruction of the base band portion 4, the duplexer 7 switches the time slot between upload (transmission from the computer 20 to the base station device) and download (transmission from the base station device to the computer 20). In the time slot of the upload, a signal input from the transmitter 6 is output to the antenna 8, and in the time slot of the download, a signal input from the antenna 8 is output to the receiver 9.

The antenna 8 transmits an upload signal output from the duplexer 7 in a radio section, and also receives a download signal incoming to the antenna 8 itself and outputs it to the duplexer 7.

According to an instruction of the base band portion 4, the receiver 9 converts the frequency of a signal input from the duplexer 7, and then inputs it to the base band portion 4.

The transmission power controller 10 carries out transmission power control processing described later to control the transmission power (transmission output) when the transmitter 6 transmits a signal. Also, the transmission power controller 10 carries out the marginal power determining processing for suitably determining the transmission power.

The current measurement controller 11 obtains consumption current of the PC card terminal device 1 using a consumption current measuring portion 12. The consumption current measuring portion 12 is an ammeter, and it measures the consumption current of the PC card terminal device 1 according to an instruction of the current measurement controller 11 and outputs the measurement result to the current measurement controller 11.

The current measurement controller 11 obtains inrush current and stationary current on the basis of the consumption current measured by the consumption current measuring portion 12. The inrush current is a large input current which temporarily flows when the consumption current of the device rapidly increases. For example, when the transmission power of the transmitter 6 increases rapidly, the consumption current increases rapidly, and thus large inrush current occurs. However, the inrush current is temporary, and after a period of time from the rapid increase of the consumption current, the inrush current is stabilized. The stationary current is this stabilized input current.

The current measurement controller 11 achieves the maximum power which the computer 20 can supply, and stores it into the storage portion 5 in association with the identification information for identifying the computer 20.

A card bus-USS bridge 13 is an interface conversion device for receiving/transmitting signals between the base band portion 4 and the computer 20.

Figure 2:
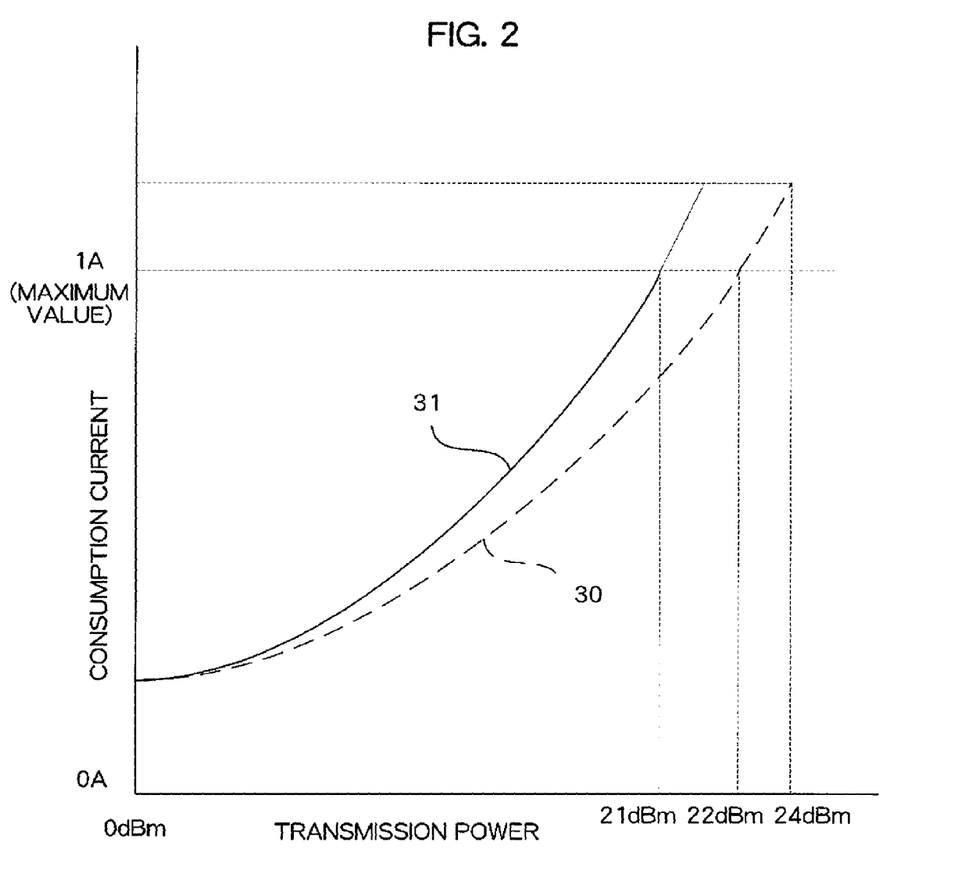
FIG. 2 is a diagram showing the relationship between transmission power and consumption current in the PC card terminal device according to the embodiment of the present invention.

FIG. 2 is a diagram showing the relationship between the transmission power after the transmission power is increased from 0 at a stroke (hereinafter referred to as "after-increase transmission power"), and the consumption current of the PC card terminal device 1 obtained by the current measurement controller 11. In FIG. 2, a broken line 30 represents stationary current, and a solid line 31 represents inrush current.

In the case of the same after-increase transmission power, the inrush current is larger than the stationary current as shown in FIG. 2. Here, so-called spec current exists in the PC card terminal device 1, and if the consumption current exceeds the spec current, the operation of the PC card terminal device 1 would become unstable, or if the worst happens, the PC card terminal device 1 would be damaged. In FIG. 2, 1A represents the current value of the spec current. In FIG. 2, when the transmission power is equal to 21 dBm, the inrush current would be equal to the spec current. Therefore, it has been hitherto common practice to prevent the transmission power from exceeding 21 dBm so that the inrush current does not exceed the spec current. However, according to this embodiment, higher transmission power can be achieved. Next, the processing for determining the marginal power to achieve the higher transmission power will be described in detail.

Figure 3:
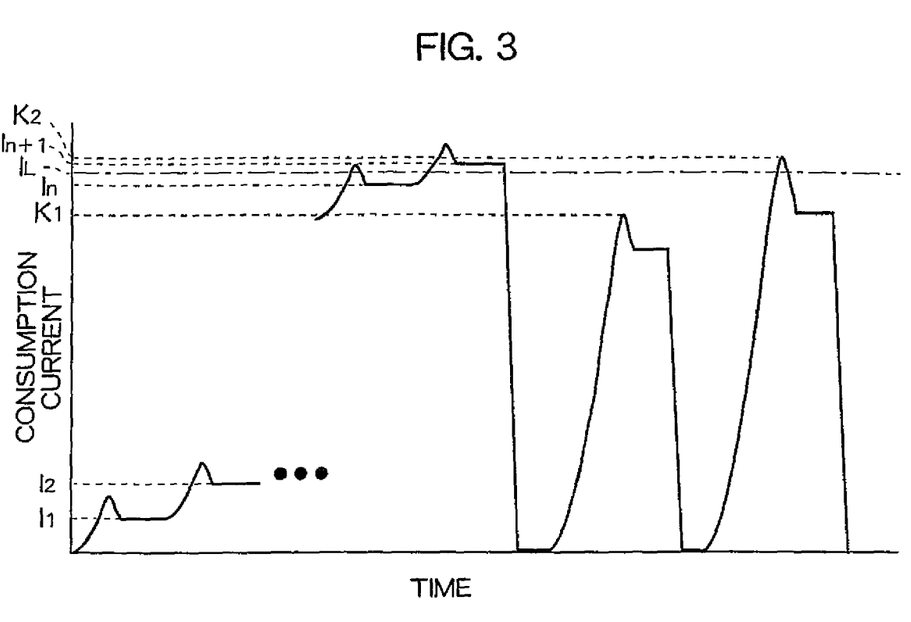
FIG. 3 is a diagram showing the relationship between the time and the consumption current in the PC card terminal device according to the embodiment of the present invention.

FIG. 3 is a diagram showing the relationship between the time and the consumption current. First, the processing of determining the marginal power will be briefly described hereunder with reference to the accompanying drawings.

The transmission power controller 10 first increases the transmission power at a slowly increasing rate (the lowest increasing rate in the PC card communication device 1) step by step. When the transmission power is increased step by step as described above, the stationary current increases like $I_1, I_2, \ldots$, as shown in FIG. 3. When the stationary current exceeds the spec current $I_1$ stored in the storage portion 5, the transmission power controller 10 determines the transmission power one step prior as second marginal power (in FIG. 3, the transmission power corresponding to $I_n$ is set as the second marginal power). That is, the second marginal power is the maximum transmissible power when the transmission power is increased step by step (i.e. the maximum transmission power under the condition that the current value of the stationary current does not exceed the spec current $I_L$).

Subsequently, the transmission power controller 10 increases the transmission power from transmission power of zero at a sharply increasing rate (a rate larger than the lowest increasing rate). In this case, the inrush current increases like $K_1, K_2, \ldots$. When the inrush current falls into a stipulated value range from the spec current $I_L$, the transmission power controller 10 determines the transmission power at that time as first marginal power (in FIG. 3, the transmission power corresponding to $K_2$ is set as first marginal power). That is, the first marginal power is the maximum transmissible power when the transmission power is suddenly increased from the transmission power of zero (i.e. the maximum transmission power under the condition that the current value of the inrush current is within a stipulated value from the spec current $I_L$).

The detailed marginal power determining processing as described above will be described with reference to FIGS. 4 and 5.

Figure 4:
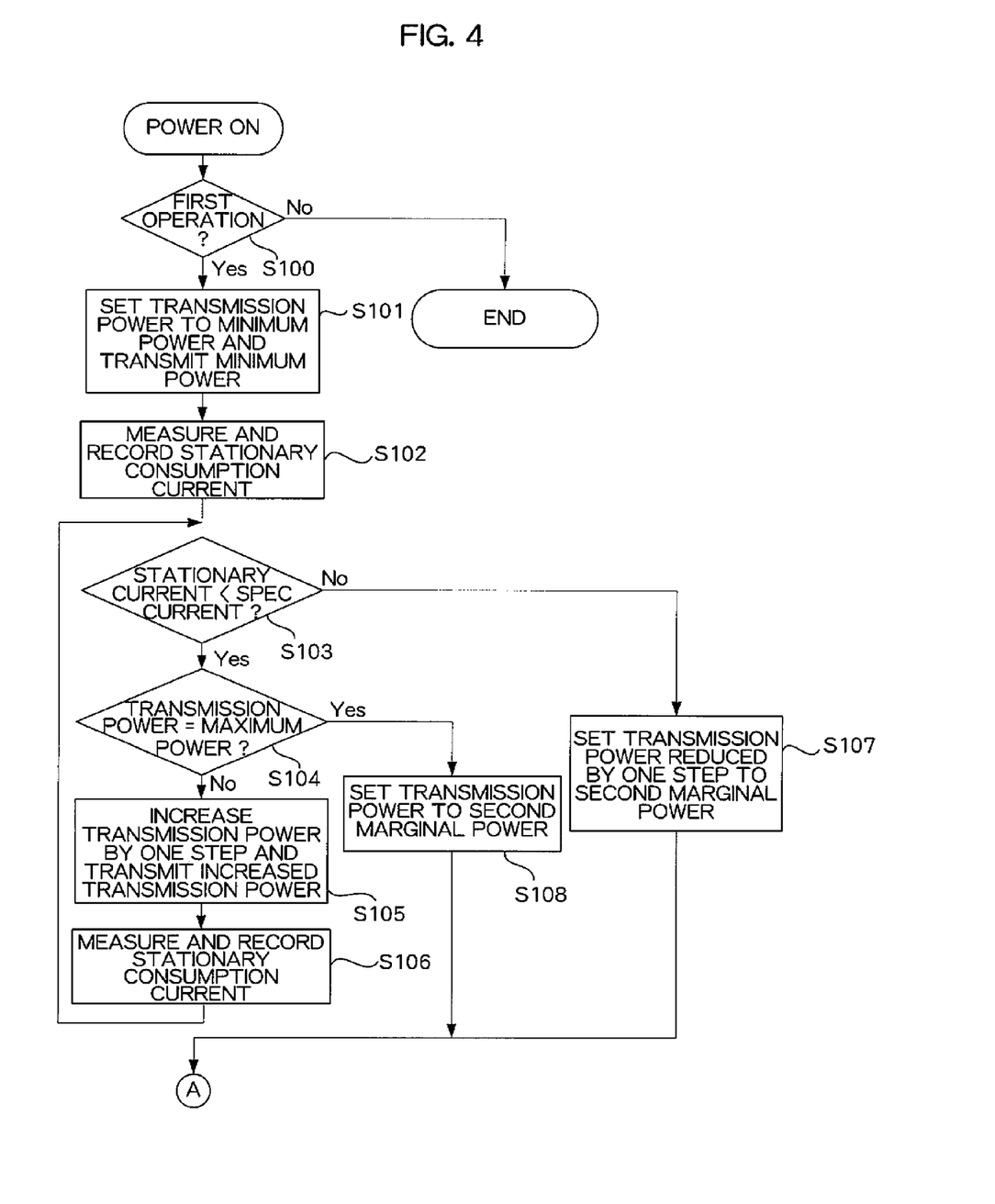
FIG. 4 is a flowchart showing the processing of the PC card terminal device according to the embodiment of the present invention.
Figure 5:
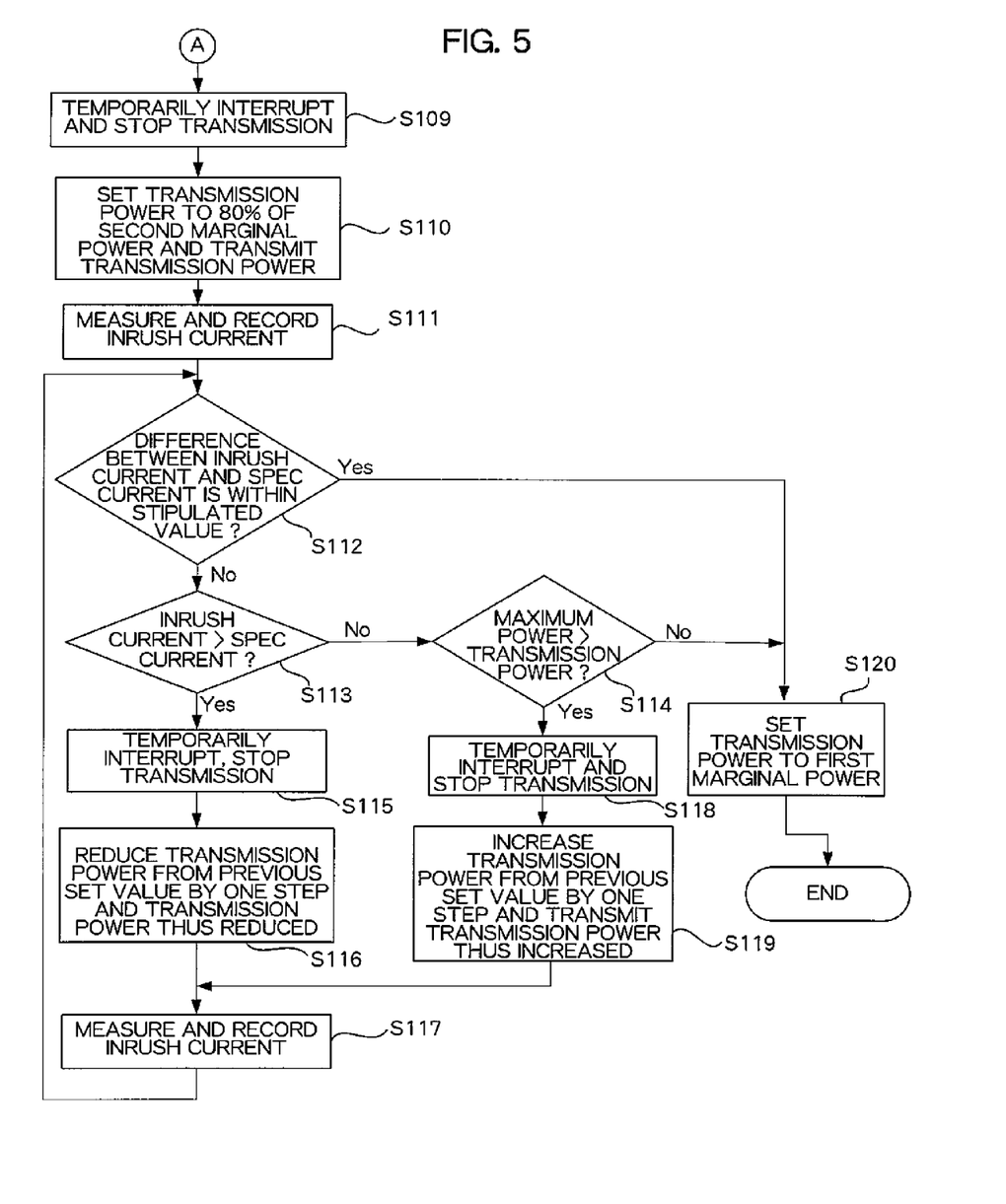
FIG. 5 is a flowchart showing the processing of the PC card terminal device according to the embodiment of the present invention.

FIGS. 4 and 5 are flowcharts showing the marginal power determining processing. When the PC card terminal device 1 is inserted into the card slot 21 and power is turned on, the marginal power determining processing is started. When the processing is started, the base band portion 4 judges whether it is the first time to insert the PC card terminal device 1 in the computer 20 (S100). When it is a first time insertion of the PC card terminal device 1 into the computer 20, processing for installing a driver into the computer 20 is carried out. The base band portion 4 detects whether the above processing has been executed or not, whereby it is judged whether the insertion of the PC card terminal device 1 into the computer 20 is the first insertion time or not.

If it is not the first time insertion, the base band portion 4 finishes the processing. If it is the first time insertion, the base band portion 4 instructs the transmission power controller 10 to start the processing of determining the marginal power.

First, the transmission power controller 10 executes the processing for determining the maximum marginal transmission power (second marginal power) under the condition that the stationary current does not exceed the spec current when the transmission power is increased at a slowly increasing rate step by step.

Specifically, the transmission power controller 10 first sets the transmission power to the minimum power, and transmits a signal (S101). The signal transmitted in the marginal power determining processing is a dummy signal, and thus it is actually unnecessary to transmit the dummy signal from the antenna 8. The transmission power controller 10 stores the current value of the stationary current at this time into the storage portion 5 using the current measurement controller 111 (S102).

Subsequently, the transmission power controller 10 judges whether the latest stationary current stored in the storage portion 5 is lower than the spec current (S103). In the judgment of S103, when it is judged that the latest stationary current is lower than the spec current, the transmission power controller 10 judges whether the transmission power is equal to the maximum power (S104). On the other hand, if it is judged that the judgment of S103 indicates that the latest stationary current is higher than the spec current, the transmission power controller 10 stores the transmission power decreased from the present transmission power by one step as the second marginal power in the storage portion 5 in association with the identification information for identifying the computer 20 (S107).

When it is judged in S104 that the transmission power is not equal to the maximum power, the transmission power controller 10 increases the transmission power by one step (S105). The transmission power controller 10 stores the current value of the stationary current at this time into the storage portion 5 through the current measurement controller 11 (S106), and then returns the processing to S103.

On the other hand, when it is judged in S104 that the transmission power is equal to the maximum power, the transmission power controller 10 stores the present transmission power (that is, the maximum power) as second marginal power into the storage portion 5 in association with the identification information for identifying the computer 20 (S108). That is, in this case, since it becomes clear that the stationary current does not exceed the spec current even when the transmission power is set to the maximum power, the transmission power controller 10 sets the maximum power to the second marginal power.

As described above, the transmission power controller 10 determines the second marginal power. Subsequently, the transmission power controller 10 executes the processing of determining the maximum marginal transmission power (first marginal power) under the condition that the inrush current does not exceed the spec current when the transmission power is increased at a sharply increasing rate. In this embodiment, the transmission power controller 10 particularly determines the first marginal power when the transmission power is increased from the transmission power of zero.

In S109, the transmission power controller 10 temporarily interrupts the transmission, and stops the processing. That is, the transmission power is temporarily returned to zero. The transmission power controller 10 sets the transmission power to 80% of the second marginal power, and transmits the signal (S110). At this time, the transmission power controller 10 stores the current value of the inrush current at this time into the storage portion 5 through the current measurement controller 11 (S111).

Subsequently, the transmission power controller 10 judges whether the difference between the spec current and the latest inrush current stored in the storage portion 5 is within a stipulated value (S112). If the difference is within the stipulated value, the transmission power controller 10 stores the present transmission power as the first marginal power into the storage portion 5 in association with the identification information for identifying the computer 20 (S120). That is, the first marginal power may exceed the spec current if it is within the stipulated value unlike the second marginal power. Therefore, as in the case of the processing shown in S112 and S120, irrespective of whether the inrush current exceeds the spec current, the present transmission power is stored as the second marginal power if the difference between the inrush current and the spec current is within the stipulated value.

If the difference between the inrush current and the spec current is not within the stipulated value in S112, the transmission power controller 10 judges whether the latest inrush current stored in the storage portion 5 is lower than the spec current (S113). If it is judged in S113 that the latest inrush current is lower than the spec current, the transmission power controller 10 judges whether the transmission power is lower than the maximum power (S114).

If it is judged in step S113 that the latest inrush current is not lower than the spec current, the transmission power controller 10 temporarily interrupts the transmission, and stops the processing (S115). That is, the transmission power is temporarily returned to zero. Then, the transmission power controller 10 sets the transmission power to the transmission power achieved by reducing the present transmission power by one step, and transmits the signal (S116).

On the other hand, if it is judged in S114 that the transmission power is lower than the maximum power, the transmission power controller 10 temporarily interrupts the transmission, and stops the processing (S119). That is, the transmission power is temporarily returned to zero. Then, the transmission power controller 10 sets the transmission power to the transmission power achieved by increasing the present transmission power by one step, and transmits the signal (S119).

When the signal is transmitted in step S116 or S119, the transmission power controller 10 stores the inrush current at this time into the storage portion 5 through the current measurement controller 11 (S117), and returns the processing to S112.

If it is judged in S114 that the transmission power is not lower than the maximum power, the transmission power controller 10 stores the present transmission power as the first marginal power in the storage portion 5 in association with the identification information for identifying the computer 20 (S120). This is the case where the inrush current is lower than the spec current by a large level (above the stipulated value) in spite of the condition that the transmission power is not lower than the maximum power, so that the maximum power is set as the first marginal power.

As described above, the transmission power controller 10 determines the first marginal power.

Subsequently, the transmission power control processing in which the transmission power controller 10 carries out the transmission power control by using the first marginal power and the second marginal power determined as described above will be described.

Figure 6:
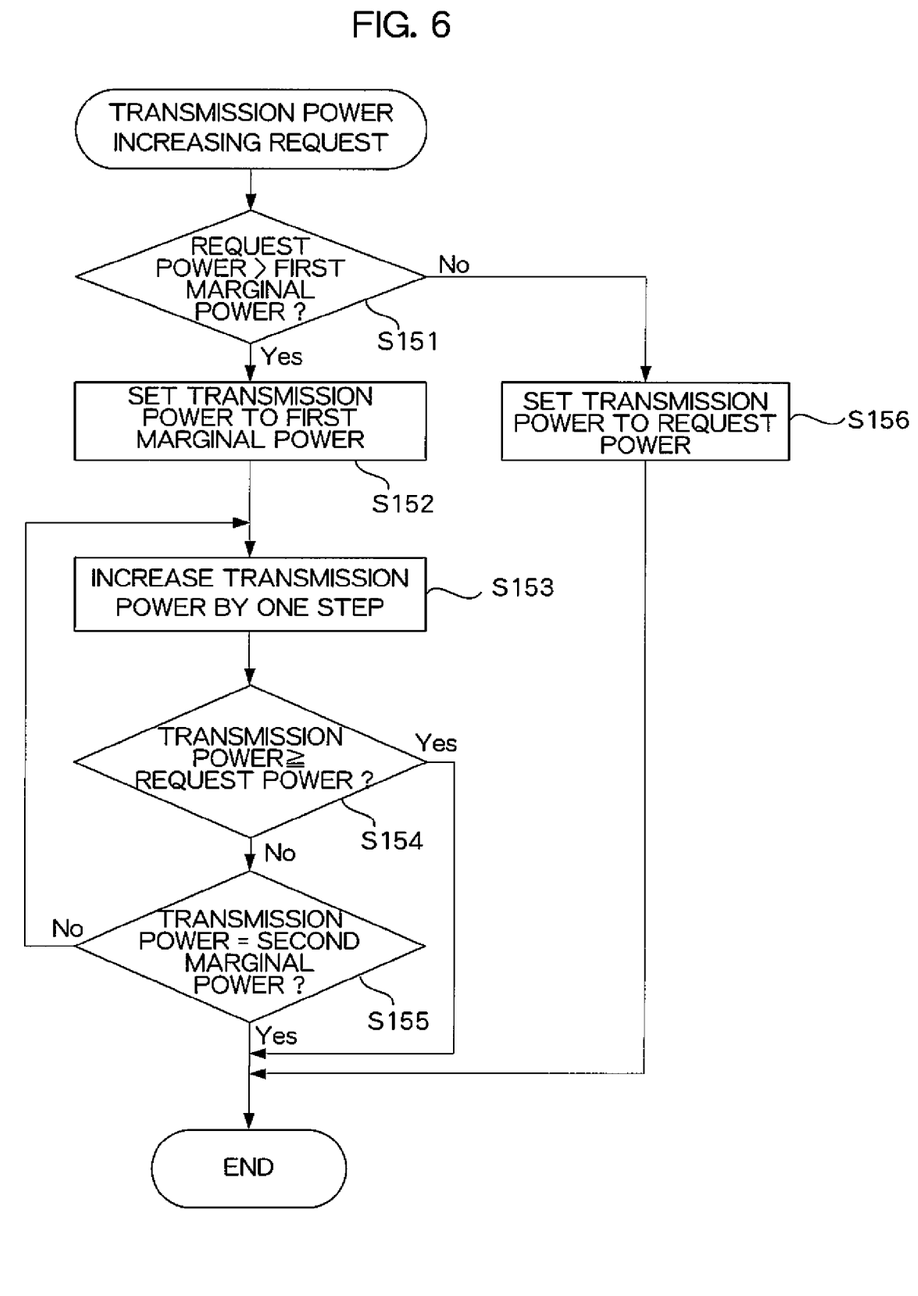
FIG. 6 is a flowchart showing the processing of the PC card terminal device according to the embodiment of the present invention.

FIG. 6 is a flowchart showing the transmission power control processing. As shown in FIG. 6, the transmission power controller 10 starts the transmission power control processing when it receives a transmission power increasing request from the base station device which receives a signal transmitted from the PC card terminal device 1.

The transmission power increasing request contains request power corresponding to a request value of the transmission power. Therefore, the transmission power controller 10 first judges whether the request power exceeds the first marginal power (S151). If it is judged that the request power does not exceed the first marginal power, the transmission power controller 10 sets the transmission power to the request power and transmits a signal (S156). That is, in this case, even when the transmission power is suddenly set to the request power, the inrush current does not exceed the spec current. Therefore, the transmission power controller 10 sets the transmission power to the request power and transmits the signal.

When it is judged in S151 that the request power exceeds the first marginal power, the transmission power controller 10 sets the transmission power to the first marginal power (S152). That is, the transmission power is suddenly increased up to the first marginal power. The transmission power controller 10 increases the transmission power at the step-by-step increasing rate (S153) until there any one of the condition that the transmission power is equal to or more than the request power (S154) and the condition that the transmission power is equal to the second marginal power is satisfied (S155) When the transmission power is equal to or more than the request power or is equal to the second marginal power, the processing is finished.

The transmission power controller 10 carries out the transmission power control using the first marginal power and the second marginal power as described above.

As described above, the PC card terminal device 1 can first increase the transmission power to the first marginal power at a stroke so that the inrush current falls into the predetermined range corresponding to the spec current value, and thereafter increase the transmission output at the lowest increasing rate up to the second marginal power. Therefore, the transmission output can be rapidly increased while the consumption current of the PC card terminal device 1 can be suppressed within the predetermined range corresponding to the spec current value.

Embodiment 2

A second embodiment according to the present invention will be described with reference to the drawings.

The system construction of the PC card terminal device 1 according to the second embodiment is the same as the first embodiment described with reference to FIG. 1. In the second embodiment, the transmission power control processing and the marginal power determining processing are different from those of the first embodiment. Specifically, in the first embodiment, only the first marginal power when the transmission power is increased from the transmission power of zero is determined. However, in the second embodiment, the first marginal power when the transmission power is increased from any transmission power is determined. Therefore, according to the second embodiment, the storage portion 5 stores a first marginal power storage table for storing the present transmission power and the first marginal power in association with each other for every computer 20. The marginal power determining processing according to this embodiment will be described hereunder.

Figure 7:
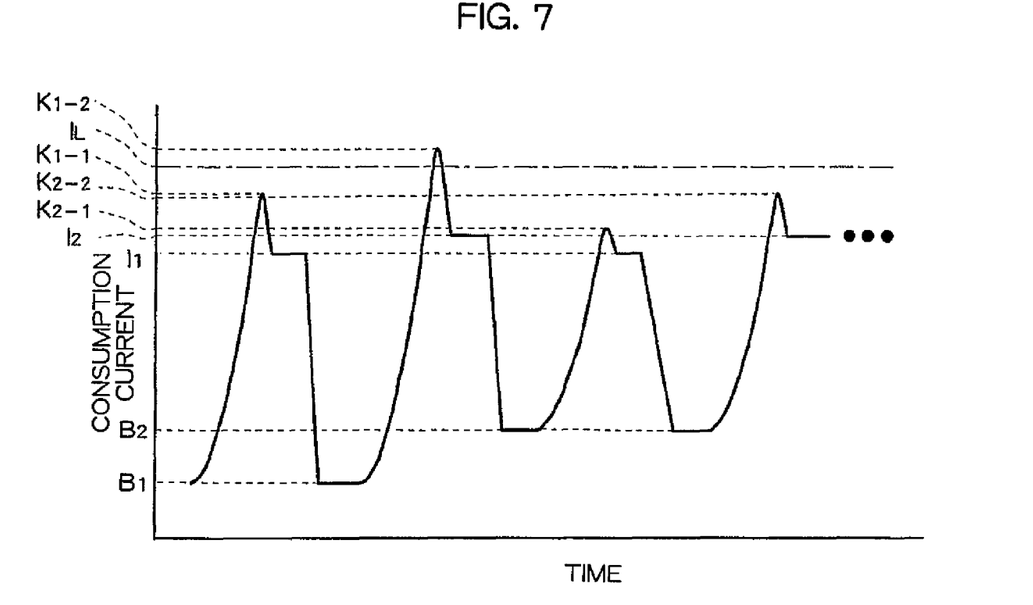
FIG. 7 is a diagram showing the relationship between the time and the consumption current in the PC card terminal device according to the embodiment of the present invention.

FIG. 7 is a diagram showing the relationship between the time and the consumption current. First, the marginal power determining processing will be briefly described with reference to the drawings.

First, the transmission power controller 10 increases the transmission power at a sharply increasing rate from the minimum transmission power with which the consumption current is equal to $B_1$ till the transmission power with which the stationary current is equal to $I_1$. In this case, the inrush current is equal to $K_{1-1}$. Subsequently, the transmission power controller 10 increases the transmission power at the sharply increasing rate from the minimum transmission power with which the consumption current is equal to $B_1$ until the transmission power with which the stationary current is equal to $I_2$. In this case, the inrush current is equal to $K_{1-2}$. Here, the difference between the inrush current $K_{1-1}$ and the spec current $I_L$ is above a stipulated value, but the difference between the inrush current $K_{1-2}$ and the spec current $I_L$ is within the stipulated value. Therefore, the transmission power controller 10 determines the transmission power with which the stationary current is equal to $I_2$, as the first marginal power corresponding to the transmission power with which the consumption current is equal to $B_1$.

Subsequently, the transmission power controller 10 likewise increases the transmission power at a sharply increasing rate from the transmission power with which the consumption current is equal to $B_2$, thereby determining the first marginal power corresponding to the transmission power with which the consumption current is equal to $B_1$. The transmission power controller 10 repeats the above-described processing for every before-increase transmission power, and determines the first marginal power corresponding to each before-increase transmission power.

The details of the marginal power determining processing as described above will be described with reference to FIG. 8.

Figure 8:
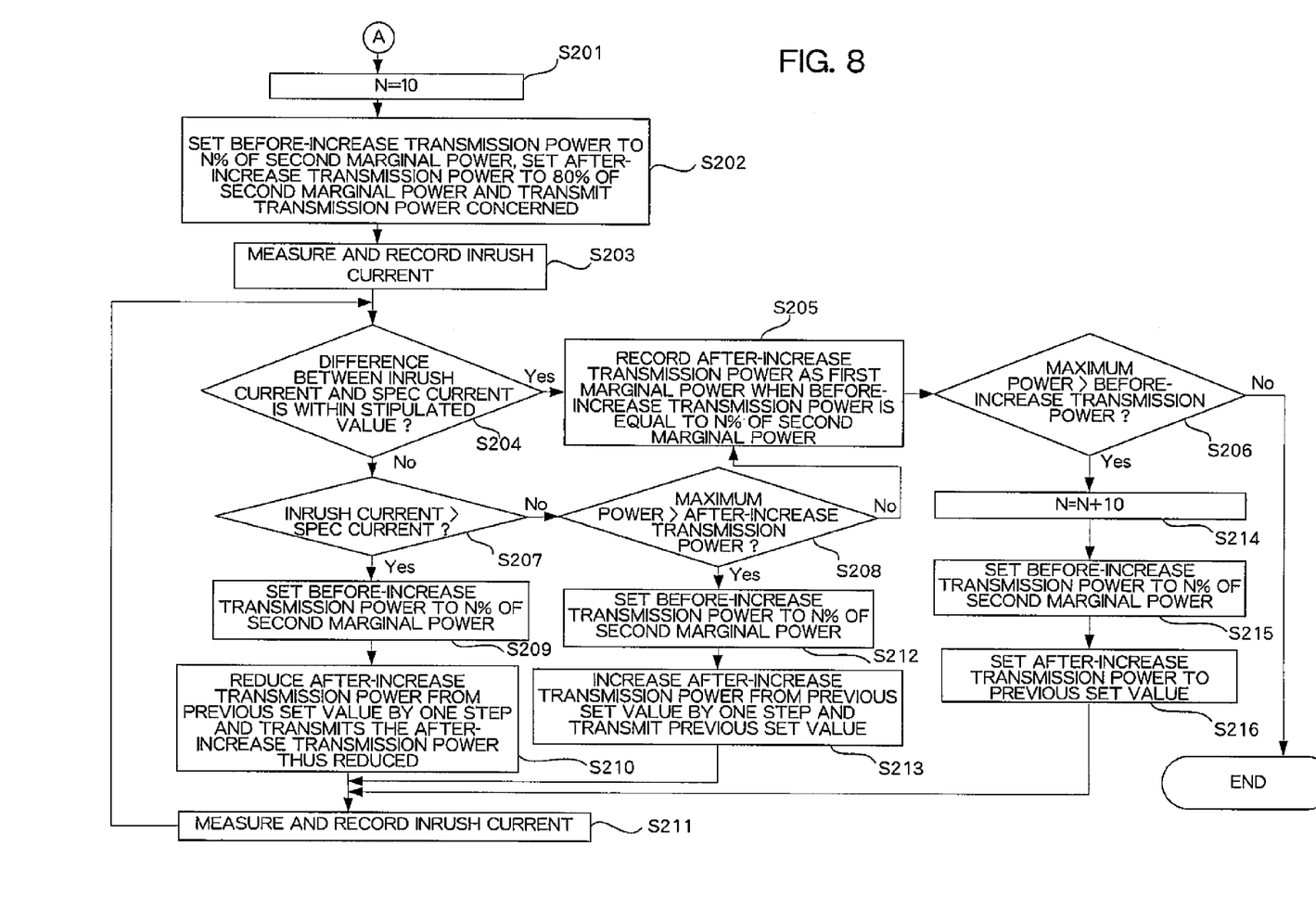
FIG. 8 is a flowchart showing the processing of the PC card terminal device according to the embodiment of the present invention.

FIG. 8 is a flowchart showing the marginal power determining processing. As shown in FIG. 8, the processing from S100 to S108 is the same as the processing of the first embodiment described with reference to FIG. 4.

In S201 and the subsequent steps, the transmission power controller 10 executes the processing for determining the maximum marginal transmission power (first marginal power) under the condition that the inrush current does not exceed the spec current when increasing the transmission power at the sharply increasing rate. This processing is executed for every before-increase transmission power.

In S201, the transmission power controller 10 secures a storage area for a variable N, and substitutes a predetermined value 10 into the variable N (S201). Then, the transmission power controller 10 sets the before-increase transmission power to N % of the second marginal power, sets the after-increase transmission power to 80% of the second marginal power, and transmits the signal (S202). At this time, the transmission power controller 10 stores the current value of the inrush current at this time into the storage portion 5 (S203).

Subsequently, the transmission power controller 10 judges whether the difference between the latest inrush current stored in the storage portion 5 and the spec current is within a stipulated value (S204). When the difference is within the stipulated value, the transmission power controller 10 stores the after-increase transmission power as first marginal power when the before-increase transmission power is equal to N % of the second marginal power in a first marginal power storage table in association with the identification information for identifying the computer 20 (S205). Then, the transmission power controller 10 judges whether the before-increase transmission power is lower than the maximum power (S206). If the before-increase transmission power is not lower than the maximum power, the processing is finished.

If it is judged in S206 that the before-increase transmission power is lower than the maximum power, the transmission power controller 10 adds 10 to the value of the variable N (S214), sets the before-increase transmission power to N % of the second marginal power (S215), sets the after-increase transmission power to the previous same value and then transmits the signal (S216).

If it is judged in S204 that the difference between the latest inrush current and the spec current is not within the stipulated value, the transmission power controller 10 judges whether the latest inrush current stored in the storage portion 5 is lower than the spec current (S207). If it is judged in S207 that the latest inrush current is lower than the spec current, the transmission power controller 10 judges whether the after-increase transmission power is lower than the maximum power (S208).

If it is judged in S207 that the latest inrush current is not lower than the spec current, the transmission power controller 10 sets the before-increase transmission power to N % of the second marginal power (S209), sets the after-increase transmission power to the value which is reduced from the previous value by one step, and then transmits the signal (S210).

On the other hand, if it is judged in S208 that the after-increase transmission power is lower than the maximum power, the transmission power controller 10 sets the before-increase transmission power to N % of the second marginal power (S212), sets the after-increase transmission power to the value which is increased from the previous value by step, and transmits the signal (S213).

When the signal is transmitted in S210, S213 or S216, the transmission power controller 10 stores the current value of the inrush current at this time into the storage portion 5 through the current measurement controller 11 (S211), and returns the processing to S204.

If it is judged in S208 that the after-increase transmission power is not lower than the maximum power, the transmission power controller 10 stores the after-increase transmission power as the first marginal power when the before-increase transmission power is equal to N % of the second marginal power, into the first marginal power storage table in association with the identification information for identifying the computer 20 (S205). This is the case where the inrush current is lower than the spec current by a great degree (above the stipulated value described above) although the after-increase transmission power is not lower than the maximum power, so that the maximum power is set as the first marginal power when the before-increase transmission power is equal to N % of the second marginal power.

Figure 9:
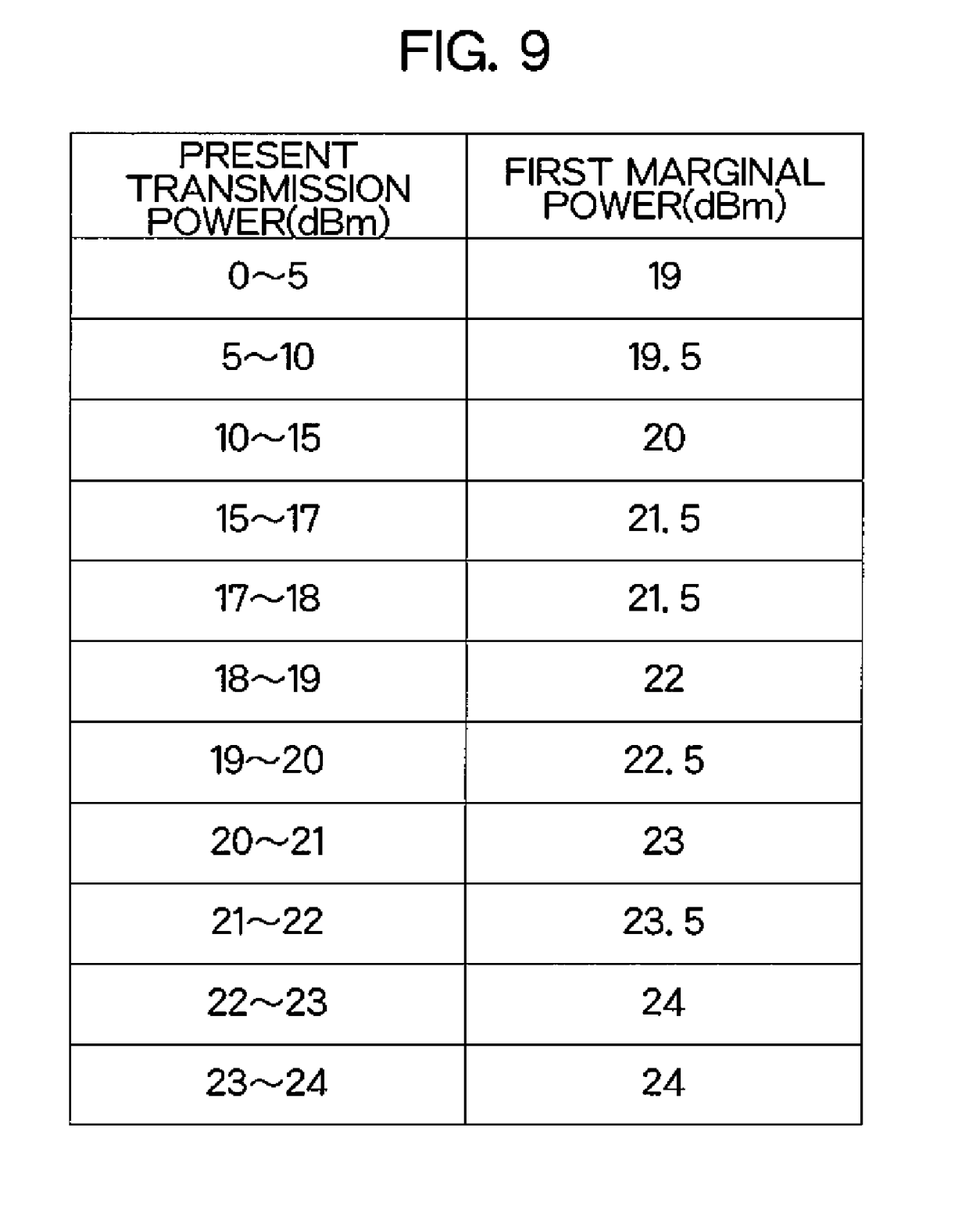
FIG. 9 shows the first marginal power storage table according to the embodiment of the present invention.

As described above, the transmission power controller 10 generates the first marginal power storage table. FIG. 9 shows an example of the first marginal power storage table thus generated. As shown in FIG. 9, in the first marginal power storage table, "present transmission power (before-increase transmission power)" and "first marginal power" are stored in association with each other. Furthermore, the first marginal power storage table is stored every computer 20.

Next, the transmission power control processing that the transmission power controller 10 carries out for the transmission power control using the first marginal power storage table thus generated will be described.

Figure 10:
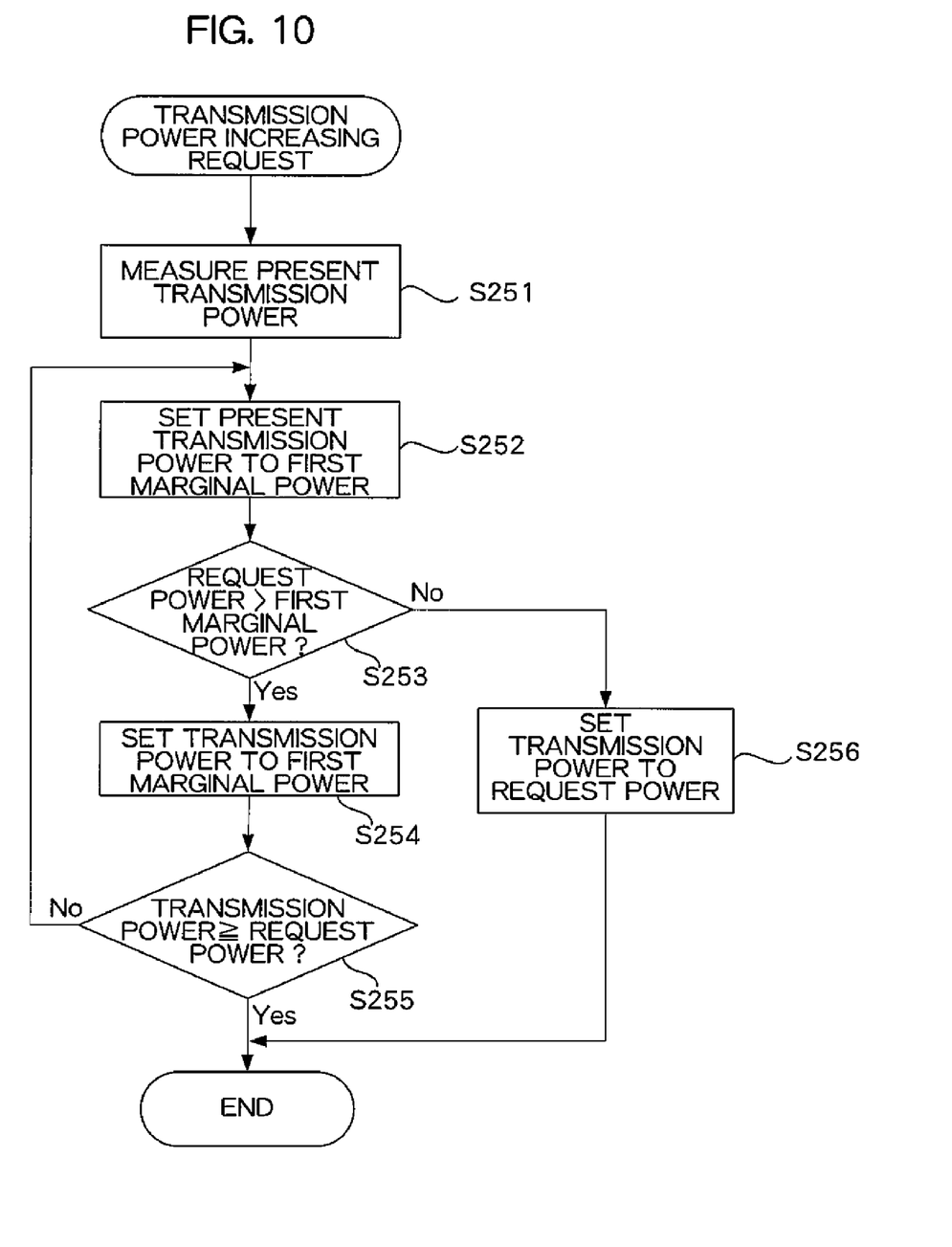
FIG. 10 is a flowchart showing the processing of the PC card terminal device according to the embodiment of the present invention.

FIG. 10 is a flowchart showing the transmission power control processing. As shown in FIG. 10, the transmission power controller 10 starts the transmission power control processing when receiving a transmission power increasing request from the base station device for receiving the signal transmitted from the PC card terminal device 1.

The transmission power controller 10 first achieves the present transmission power by the current measurement controller 11 (S251). Subsequently, the transmission power controller 10 reads out the first marginal power for the present transmission power from the first marginal power storage table (S252).

Subsequently, the transmission power controller 10 judges whether the request power contained in the transmission power increasing request exceeds the first marginal power (S253). If the request power does not exceed the first marginal power, the transmission power controller 10 sets the transmission power to the request power and transmits the signal (S256). That is, in this case, even when the transmission power is suddenly set to the request power, the inrush current does not exceed the spec current, and thus the transmission power controller 10 sets the transmission power to the request power and transmits the signal.

On the other hand, if it is judged in S253 that the request power exceeds the first marginal power, the transmission power controller 10 sets the transmission power to the first marginal power (S252). That is, the transmission power is suddenly increased up to the first marginal power. The transmission power controller 10 repeats the processing from S252 until the transmission power is equal to or more than the request power (S255). When the transmission power increases to the request power or more, the transmission power controller 10 finishes the processing.

The repetitive processing described above will be described in more detail with reference to FIG. 11.

Figure 11:
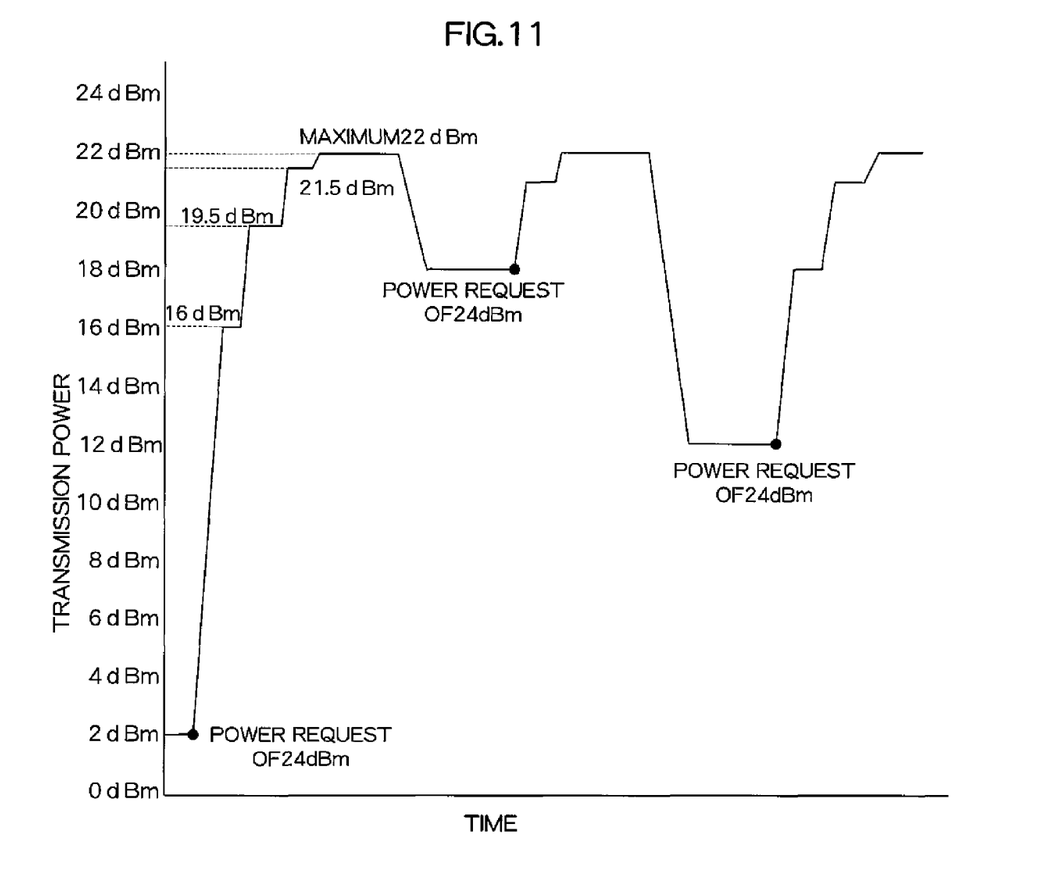
FIG. 11 is a diagram showing the relationship between the time and the transmission power in the PC card terminal device according to the embodiment of the present invention.

FIG. 11 is a diagram showing the relationship between the time and the transmission power in a specific example of the transmission power control processing. In FIG. 11, the PC card terminal device 1 transmits signals with transmission power of 2 dBm as an initial state. When the electric propagation condition is deteriorated, the PC card terminal device 1 receives a transmission power increasing request for increasing the transmission power from the base station device. Here, it is assumed that the PC card terminal device 1 receives a transmission power increasing request for increasing the transmission power to 24 dBm.

In this case, the PC card terminal device 1 first reads out the first marginal power of 1 dBm stored in association with 2 dBm, and increases the transmission power till 16 dBm. Subsequently, the PC card terminal device 1 reads out the first marginal power of 19.5 dBm stored in association with 1 dBm, and increases the transmission power up to 19.5 dBm. The PC card terminal device 1 repeats this processing until the transmission power is equal to or more than the request power. However, since the maximum power of the PC card terminal device 1 is equal to 22 dBm, actually the transmission power is not increased to the request power or more, and it is equal to 22 dBm at maximum.

When the electric wave propagation condition is afterwards improved, the transmission power is lowered by another transmission power processing. Then, when the electric wave propagation condition is deteriorated again, the above processing is repeated from the transmission power at that time.

As described above, the transmission power controller 10 carries out the transmission power control using the first marginal power storage table.

As described above, the PC card terminal device 1 stores the first marginal power (first marginal transmission power) for every before-increase transmission power. Therefore, even when the before-increase transmission power is equal to any value, the transmission power can be rapidly increased while the consumption current of the wireless communication device is suppressed within the prescribed range corresponding to the spec current value.

While there have been described what are at present considered to be preferred embodiments of the invention, it will be understood that various modifications may be made thereto, and it is intended that the appended claims cover all such modifications as fall within the true spirit and scope of the invention.

Furthermore, the disclosure of Japanese Patent Application No. 2005-190636 filed on Jun. 29, 2005, including specification, claims, drawings, and abstract is incorporated herein by reference in its entirety.

What is claimed is:

1. A wireless communication device that operates while supplied with power from host equipment in which the wireless communication device is mounted, comprising:

a first marginal transmission power determining unit for determining first marginal transmission power;

a first transmission power increasing unit for increasing the transmission power of the wireless communication device up to the first marginal transmission power at a first increasing rate;

a second transmission power increasing unit for further increasing the transmission power at a second increasing rate smaller than the first increasing rate if the transmission power is increased up to the first marginal transmission power; and wherein the first marginal transmission power is a power of a wireless signal transmitted to a base station.

2. The wireless communication device according to claim 1, wherein the first marginal transmission power determining unit contains a transmission power controller for controlling the transmission power so that inrush current falls into a predetermined range when the transmission power of the wireless communication device is increased; and the first marginal transmission power determining unit determines the transmission power after the increase of the transmission power as first marginal transmission power.

3. The wireless communication power device according to claim 1, further comprising a second marginal transmission power determining unit for determining second marginal transmission power larger than the first marginal transmission power, wherein the second transmission power increasing unit further increases the transmission power increased to the first marginal transmission power up to the second marginal transmission power.

4. The wireless communication device according to claim 3, wherein the second marginal transmission power determining unit contains a transmission power control unit for controlling the transmission power so that stationary current falls into a predetermined range after the transmission power of the wireless communication device is increased; and the second marginal transmission power determining unit determines the transmission power after the increase of the transmission power as second marginal transmission power.

5. The wireless communication device according to claim 1, wherein the first marginal transmission power determining unit determines the first marginal transmission power for every transmission power before the increase, the wireless communication device further contains a current measurement controller for achieving the transmission power when the wireless communication device transmits a wireless signal; and the first transmission power increasing unit increases the transmission power of the wireless communication device up to first marginal transmission power determined by the first marginal transmission power determining unit based on the transmission power achieved by the current measurement controller.

6. The wireless communication device according to claim 5, wherein the first marginal transmission power determining unit contains a transmission power control unit for controlling the transmission power for every transmission power before the increase so that inrush current falls into a predetermined range when the transmission power of the wireless communication device is increased; and the first marginal transmission power determining unit determines the transmission power after the increase as first marginal transmission power for the transmission power before the increase.

7. A wireless communication device that operates while supplied with power from host equipment in which the wireless communication device is mounted, comprising:

a first marginal transmission power determining unit for determining first marginal transmission power;

a first transmission power increasing unit for increasing the transmission power of the wireless communication device up to the first marginal transmission power; and a second transmission power increasing unit for further increasing the transmission power increased up to the first marginal transmission power at an increasing rate smaller than the increasing rate based on the first transmission power increasing unit, a second marginal transmission power determining unit for determining second marginal transmission power larger than the first marginal transmission power, wherein the second transmission power increasing unit further increases the transmission power increased to the first marginal transmission power up to the second marginal transmission power; and wherein the second marginal transmission power determining unit contains a transmission power control unit for controlling the transmission power so that stationary current falls into a predetermined range after the transmission power of the wireless communication device is increased; and the second marginal transmission power determining unit determines the transmission power after the increase of the transmission power as second marginal transmission power.

8. A wireless communication device that operates while supplied with power from host equipment in which the wireless communication device is mounted, comprising:

a first marginal transmission power determining unit for determining first marginal transmission power;

a first transmission power increasing unit for increasing the transmission power of the wireless communication device up to the first marginal transmission power; and a second transmission power increasing unit for further increasing the transmission power increased up to the first marginal transmission power at an increasing rate smaller than the increasing rate based on the first transmission power increasing unit;

wherein the first marginal transmission power determining unit determines the first marginal transmission power for every transmission power before the increase, the wireless communication device further contains a current measurement controller for achieving the transmission power when the wireless communication device transmits a wireless signal; and the first transmission power increasing unit increases the transmission power of the wireless communication device up to first marginal transmission power determined by the first marginal transmission power determining unit based on the transmission power achieved by the current measurement controller; and wherein the first marginal transmission power determining unit contains a transmission power control unit for controlling the transmission power for every transmission power before the increase so that inrush current falls into a predetermined range when the transmission power of the wireless communication device is increased; and the first marginal transmission power determining unit determines the transmission power after the increase as first marginal transmission power for the transmission power before the increase.

* * * * *